United States Patent Office 3,717,525
Patented Feb. 20, 1973

3,717,525
METHOD FOR PRODUCTION OF A DIFFUSION MEMBRANE ARRANGEMENT
Hans-Joachim Bültemann, Bremen, Germany, assignor to Varian Mat GmbH, Bremen, Germany
Filed May 23, 1968, Ser. No. 731,386
Claims priority, application Germany, June 5, 1967, B 92,867
Int. Cl. B32b 5/18, 31/12
U.S. Cl. 156—77                                   6 Claims

ABSTRACT OF THE DISCLOSURE

The invention is concerned with a method of making gas diffusion membranes. The pores adjacent the surface of a porous permeable carrier member are filled with a material, later to be removed, a diffusion member is applied to that surface, and the filler material is then removed. In another embodiment a diffusion member is applied to a glass carrier member which is pore-free, and the glass is then made porous by heat treatment and selective dissolution.

---

The invention relates to a diffusion membrane arrangement, more particularly for leakage detector tubes with a selectively permeable membrane window and measurement by ionisation and ion current measurements.

The gas permeability of membranes increases in inverse proportion to the membrane thickness and exponentially with the membrane temperature. If a high gas permeability is to be achieved, then the membrane must be made as thin as possible, since the temperature cannot be made arbitrarily high.

If a desired permeability is to be achieved for certain gases, then one is moreover restricted to selected materials. Thus for example quartz is selectively permeable for helium, and palladium for hydrogen. Methods for production of thin membranes are known, for example quartz membranes with thicknesses to as little as 1 mm. Such membranes are however extremely sensitive to breakage.

It is an object of the invention to provide diffusion membranes and methods for their production, which have a good resistance to impact and breakage with as small a membrane thickness as possible. This problem is solved according to the invention in that the diffusion membrane is provided on a porous permeable carrier. Thus, the possibility is given of making the membrane thickness extremely small and thus achieving a high gas permeability, but simultaneously avoiding the hitherto high sensitivity of the membranes to fracture.

For leakage detector tubes, which operate with helium as a test gas and with a quartz membrane as a selectively permeable diffusion membrane, it is advisable to use a porous quartz plate as the porous carrier layer.

For producing the diffusion membrane arrangement of the invention, the membrane material can be applied in a layer free of pores on a carrier for example by vaporisation. Of course, other known methods can be used, with which very thin layers can be formed on carrier bodies, e.g. by depositing by means of ion atomisation, plasma atomisation and so on.

In the formation of thin membranes by atomisation or similar application procedures, an auxiliary carrier with a smooth surface can be used, from which, after formation, the membrane can be released and then connected with the porous permeable carrier. The auxiliary carrier after application of the membrane material can be dissolved by a solvent which easily dissolves the auxiliary carrier but does not dissolve the membrane material.

Preferably as carrier for receiving the membrane material, the porous permeable carrier is itself used. If in this case the width of the pores of the carrier is sufficiently small, penetration of the membrane material into the pores of the carrier surface when applying the membrane layer is avoided, or is kept to allowable limits. With larger pore widths, the remedy can be adopted that the pores of the carrier are closed by a covering or filling material before applying the membrane material, and after application of the membrane material the filler is removed, at least in the region of the pores. After closing of the pores by the covering or filling material, the carrier is advantageously smoothed. As a covering or filling material a material can be used which melts or evaporates at a lower temperature than the material of the carrier and can be brought into a liquid or vaporous phase.

After applying the membrane, the filling material can be converted into a liquid or gaseous condition by chemical reaction and drawn off, or it can be dissolved by means of a solvent.

Finally, the surface layer of the porous permeable carrier, by suitable surface treatment can itself be converted into a nonporous layer which forms the diffusion membrane, in that the surface is for example treated by electron impact or ion impact or by laser radiation.

In order to make the invention clearly understood, reference will now be made to the accompanying drawings which are given by way of example and in which.

Figure 3:
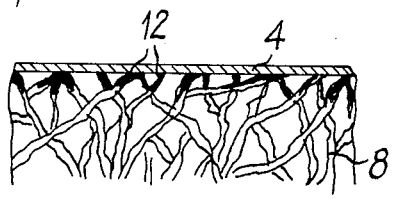
Figure 4:
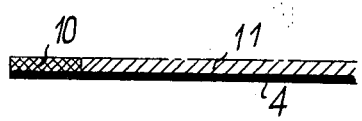
Figure 5:
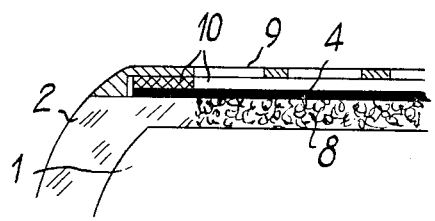

FIG. 3, to a still larger scale, is a cross-section through a membrane arrangement according to the invention, for illustrating a method of production of such an arrangement;

FIG. 4 is a partial section through a diffusion membrane for another embodiment of the membrane arrangement; and FIG. 5 is a partial cross-section through a leakage detector tube, having a membrane arrangement with a membrane according to FIG. 4.

Figure 1:
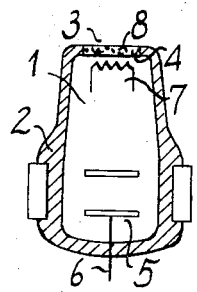
FIG. 1 is a diagrammatic sectional view of a leakage detector tube with a diffusion membrane arrangement according to the invention.

In FIG. 1, a leakage detector tube of conventional construction is diagrammatically illustrated as an example of use for the diffusion membrane arrangements according to the invention. Such a leakage detector tube comprises of a vacuum chamber 1 in a wall 2 of which a window 3 with a diffusion membrane 4 of increased permeability for preferred diffusion of a test gas to the inner chamber 1 of the tube, is provided. In the chamber 1, for indicating the presence of test gas an ionisation manometer 5 is provided which is connected through an electric line 6 with an electric indication device, not illustrated in the drawing. For increasing the gas permeability, a heating coil 7 is provided for heating the diffusion membrane 4.

The diffusion membrane 4 is provided on a porous permeable carrier 8. By this provision of the diffusion membrane on the carrier, it is possible to give the diffusion membrane a very small thickness of e.g. 3 mm., since the membrane receives the necessary support by the porous carrier and the danger of destruction by mechanical overloading is substantially removed.

The illustrated leakage detector tube can be moved along pressure vessels filled with test gas, for locating small leakage regions in the pressure vessels.

With use of helium as test gas, the diffusion membrane advantageously consists of quarts, which is selectively permeable for helium. As a material for the porous carrier, quartz is also suitable, for example the kind which is available as filter glass under the designation "Vycorbrand No. 7930" (see Werkstoffkunde der Hochvakuumtechnik by Dr. Werner Espe, volume 2 pages 451–453 VEB Deutsche Verlag der Wissenschaften Berlin 1962).

If a porous permeable carrier 8 of large pore width is used, then the diffusion membrane 4 can be placed on the inside of the vacuum chamber 1, as illustrated in FIG. 1. Thereby, the diffusion membrane is particularly well protected against mechanical stresses.

Figure 2:
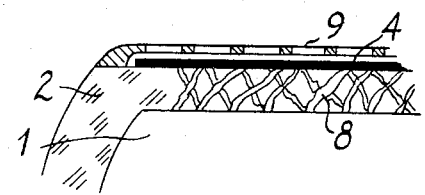
FIG. 2 is a partial cross-section through a diffusion membrane arrangement on a leakage detector tube, to a larger scale than FIG. 1.

If however a porous permeable carrier of small pore width is used, especially also of the above mentioned filter glass, the pores of which lie between 20 and 40 A., the diffusion membrane 4 is placed on the outside of the tube, as illustrated in FIG. 2, in order to bring it into as intimate contact as possible with the test gas emerging from the leakage regions. The diffusion membrane 4 can then be covered with a protective grid 9.

The diffusion membrane can form a surface layer fixedly connected with the porous permeable carrier 8, as assumed in the embodiments of FIGS. 1, 2 and 3; it can alternatively, as illustrated in FIGS. 4 and 5, consist of a separate part and lie loosely on the porous permeable carrier. In this case, the diffusion membrane 4 is preferably connected with a reinforced rim or mounting ring 10.

For producing the very thin diffusion membrane, the membrane material can for example be vaporised onto the carrier in the form of a thin pore-free layer, or can be applied by known methods of ion atomising and plasma atomising.

For producing a loose membrane according to FIGS. 4 and 5, this application of the membrane material is effected onto an auxiliary carrier, e.g. in the form of a thin plate 11, see FIG. 4, which is surrounded by the mounting ring 10 for the finished membrane. The membrane material is then applied in the described manner onto the common lower surface of the auxiliary carrier 11 and mounting ring 10. After this has occurred, the diffusion membrane 4 together with the mounting ring 10 is released from the auxiliary carrier 11 and for example in the manner visible from FIG. 5 is connected with the porous permeable carrier 8.

The releasing of the diffusion membrane 4 with its mounting ring 10 from the auxiliary carrier 11 can take place in such a manner that the auxiliary carrier 11 after application of the membrane material is dissolved by a suitable solvent which readily dissolves the auxiliary carrier but does not dissolve the membrane material. With manufacture of the diffusion membrane for example of quartz, the auxiliary carrier 11 can consist of copper and can be dissolved for example by sulphuric acid, which does not attack quartz. After this has occurred, the diffusion membrane 4 fixedly connected with the mounting ring 10 is placed loosely in the window of the chamber 1, so that it comes to lie on the porous permeable carrier 8. The protective grid 9 is then applied and the membrane with its mounting ring 10 is secured in its proper position and closed in a vacuum tight manner, so that gas can simply pass through the membrane 4 and the porous carrier 8, into the vacuum chamber 1.

If as illustrated in FIGS. 2 and 3, the diffusion membrane 4 is applied directly onto the porous permeble carrier 8 itself, then the pores of the carrier, insofar as their width would result in an inadmissible penetration of the membrane material during application, are closed before the application of the membrane material by a covering or filling material, e.g. tin, indium or an alloy of these materials. These filling materials melt at a low temperature of 100–300° C. and are brought into the liquid or vaporous phase so that the material 12, as shown in FIG. 3, fills the pores of the material in the vicinity of the surface, up to a certain depth. After closing of the pores by the covering or filling material 12, the carrier 8 is ground to smooth its surface. The membrane material is then applied to the flattened surface and thereafter the filling material 12 is caused to disappear in that for example it is dissolved in a solvent or is converted into the liquid or gaseous state and is drawn off. For this purpose, nitrohydrochloric acid can be used.

As a carrier for the membrane material, alternatively a body can be used which at first is free of pores, and after application of the membrane material is rendered porous by releasing a component in known manner from the side which is not covered. Particularly suitable for the present purpose is a glass material which can be separated by heat treatment into two phases, a soluble and an insoluble phase, as in the production of the above mentioned Vycorbrand glasses as an intermediate product of a glass having the approximate composition 75% $SiO_2$, 20% $B_2O_3$ and 5% alkali oxide. From the $SiO_2$ spongy skeleton of such a glass, after application of the membrane material, the material ($B_2O_3$ and $Na_2O$) filling the pores of the skeleton is dissolved in hot 3 n-HCl or 5 n-$H_2SO_4$ until only the $SiO_2$ skeleton with the diffusion membrane covering one side, which likewise can consist of $SiO_2$, remains.

The surface layer of the porous permeable carrier can also be converted by surface treatment into the nonporous layer forming the diffusion membrane. This conversion of the surface layer is effected preferably by radiation with a high specific energy, e.g. by means of electron impact or ion impact or laser.

Many modifications and other embodiments are possible within the frame of the invention. More particularly, the illustrated diffusion membrane arrangement is not only usable for leakage detector tubes, but is advantageous also for other purposes, for example for introducing or removing a component from a gas mixture, for separating the carrier gas from a gas chromatographic column and for gas analysis or partial pressure measurement of a gas current fed to a mass spectrometer or ionisation manometer.

A membrane with a reinforced rim, similar to that illustrated in FIGS. 4 and 5, can also be formed by more intensive vaporisation in the marginal zone, when depositing the membrane material.

More particularly with direct application of the membrane material onto the porous permeable carrier, the advantageous possibility exists of giving the diffusion membrane a desired form, for example a curved or spherical form, by providing the porous permeable carrier with a corresponding form and surface.

I claim:

1. A method for production of a diffusion membrane arrangement comprising:
   providing a rigid, porous, permeable carrier having a surface thereof of predetermined contour;
   filling the pores of said permeable carrier member, at least in the region of said pores which is adjacent said surface of said carrier member;
   forming a thin, pore-free diffusion membrane from a relatively brittle material, said membrane having a surface of substantially identical contour to that of said surface of said carrier member;
   applying said diffusion membrane to said surface of said carrier member while said pores of said carrier member are filled; and
   thereafter removing substantially all of said filler material from said carrier member.

2. A method as defined in claim 1, further comprising:
   smoothing said surface of said permeable carrier after said filling of said pores, but before said depositing of said membrane material.

3. A method as defined in claim 1, further comprising:
   said filling material being adapted to be melted at a lower temperature than that at which said carrier may be melted; and
   applying heat to said filled carrier member to liquify said filler and enable said filler to flow from said pores.

4. A method as defined in claim 1, further comprising:
said filling material being soluble in a solvent which is non-reactive with said carrier or said membrane; and applying said solvent to said filled carrier and membrane.

5. A method for production of a diffusion membrane comprising:
providing a carrier member having a surface thereof of predetermined contour, said carrier member being substantially pore-free and being formed from glass which is separable by heat treatment into a soluble phase and an insoluble phase, said insoluble phase defining a skeletal, porous structure;
applying a thin, pore-free diffusion membrane made from a relatively brittle material and having a surface of substantially identical contour to that of said surface of said carrier member to said surface of said carrier member; and
thereafter heat treating said carrier member and applying solvent thereto to dissolve said soluble phase and render said carrier member porous.

6. A method for production of a diffusion membrane arrangement comprising:
providing a porous permeable carrier of filter glass having pores dimensioned approximately between twenty and forty A.;
filling at least a portion of said porous carrier with a material capable of being removed from said pores without affecting said filter glass, at least some of said filled pores lying in the vicinity of a region of the surface of said carrier;
smoothing said filled surface region of said carrier;
applying a quartz diffusion membrane to said smoothed surface of said carrier; and
thereafter removing said filler material from said carrier.

References Cited

UNITED STATES PATENTS

| | | | |
|---|---|---|---|
| 1,174,631 | 3/1916 | Snelling | 55—16 |
| 2,824,620 | 2/1958 | De Rosset | 55—16 |
| 2,958,391 | 11/1960 | De Rosset | 55—158 |
| 3,022,187 | 2/1962 | Egrand et al. | 55—16 |
| 2,012,617 | 8/1935 | Munters | 156—77 X |
| 2,489,987 | 11/1949 | Barnola | 156—155 |
| 2,732,092 | 1/1956 | Lawrence | 55—158 |
| 3,189,499 | 6/1965 | Schwartz | 156—155 |
| 3,210,171 | 10/1965 | MacDonald | 156—272 X |
| 3,447,288 | 6/1969 | Juda et al. | 55—158 |

REUBEN EPSTEIN, Primary Examiner

U.S. Cl. X.R.

156—155; 55—158; 117—98